Oct. 9, 1923.
E. W. WILLS
CONTAINER
Filed March 17, 1922
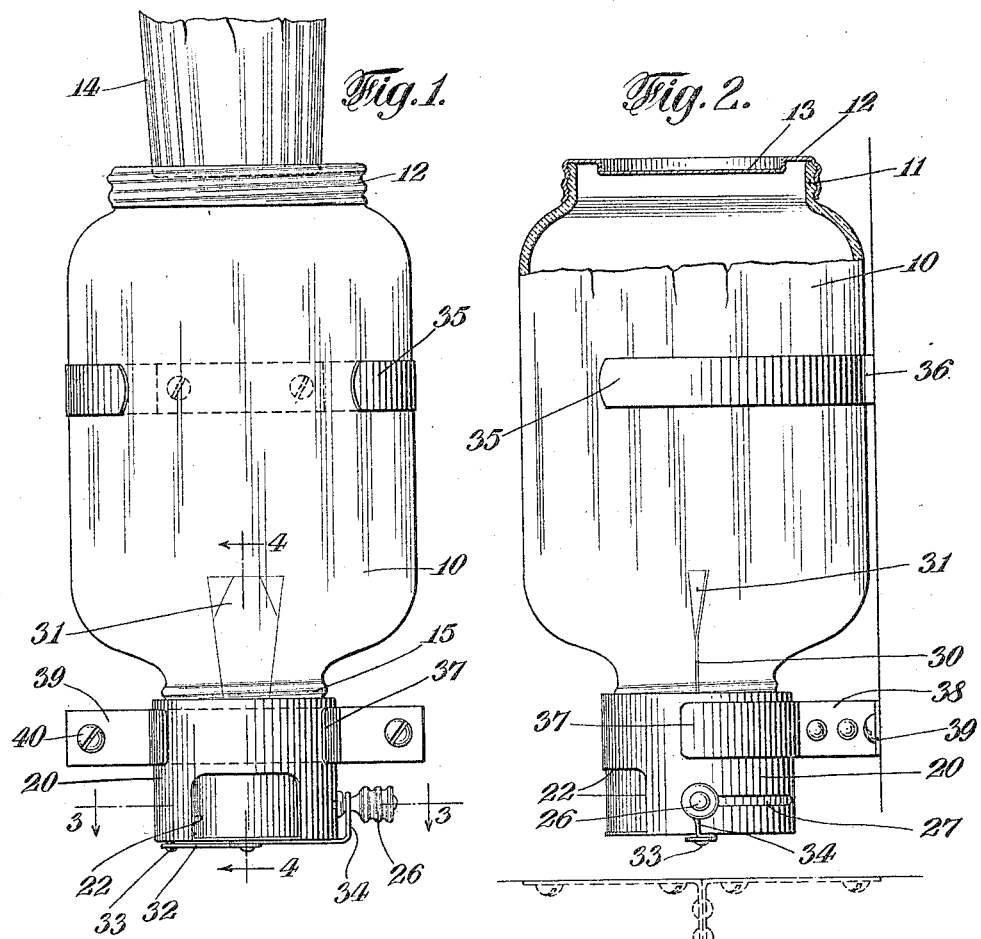
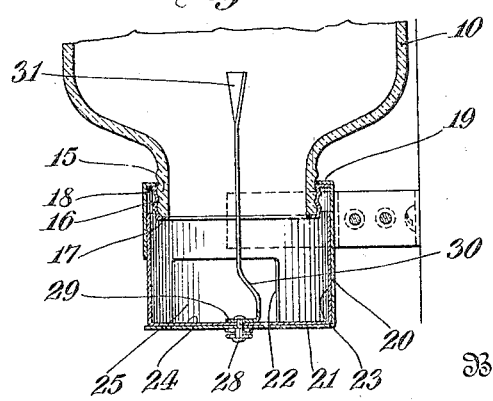
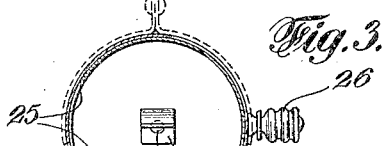
Inventor
Ernest W. Wills.
By his Attorney Patented Oct. 9, 1923.

1,470,248

UNITED STATES PATENT OFFICE.

ERNEST W. WILLS, OF GREAT KILLS, NEW YORK.

CONTAINER.

Application filed March 17, 1922. Serial No. 544,520.

*To all whom it may concern:*

Be it known that I, ERNEST W. WILLS, a citizen of Germany, residing at Great Kills, S. I., in the county of Richmond and State of New York, have invented certain new and useful Improvements in Containers, of which the following is a specification.

This invention relates to dispensing apparatus and particularly to devices for delivering from bulk a quantity of granular material as required.

One of the objects of the invention is to provide a container having means for attachment to a wall, a removable cover adapted to support a hand carrier for the material and a discharge chamber at its base, the same being provided with a self-closing shutter, the container being substantially impervious, so that its contents are unaffected by the outside air.

Another purpose is in the provision of means for agitating the contents of the container at each operation of the shutter, preventing clogging and bridging of the contents.

These and allied objects are attained by the novel construction, combination and arrangement of parts hereafter described and shown in the accompanying drawing, forming a material part of this invention, and in which:—

Figure 1 is a front elevational view of an embodiment of the invention.

Figure 2 is a side view of the same.

Figure 3 is a transverse sectional view taken on line 3—3 of Figure 1.

Figure 4 is a fragmentary longitudinal sectional view taken on line 4—4 of Figure 1.

Figure 5 is a fragmentary perspective view of the container support.

While this apparatus may be used for dispensing any dry granular or powdered material, it is particularly designed for domestic use in connection with pulverized or ground coffee beans in preparing an acceptable beverage.

It is well known that the essential oil, aroma and fragrance of ground coffee becomes quickly dissipated upon exposure to the air, rendering the beverage less palatable and agreeable than if the roasted berry be freshly ground, except in case that after grinding the same be tightly sealed.

In order to maintain the ground coffee in good condition, has been the main aim of the invention and to this purpose a container, generally designated by the numeral 10 is used.

This container is preferably made of glass, as being impervious and also transparent, the same having a contracted upper end terminating in an open annulus 11 formed with external screw threads by which it is tightly but removably engaged in a close fitting cap or cover 12, having a central circular depression 13 suited to receive and maintain a glass or cup 14 in a conveniently accessible position for use in receiving the coffee.

The lower end of the container 10 is contracted to a greater extent than the upper end and terminates in a similar but smaller screw-threaded annulus 15 to which is engaged a ring 16 having an inturned flange 17 to contact with the end of the annulus and an out-turned flange 18 at its upper edge.

Resting on said flange is a flat, washer-like ring 19 formed with the upper edge of a hollow cylindrical casing 20, having a closed bottom plate 21 and containing an outlet opening 22 in its side wall.

Neatly fitting the interior of the casing is a cylindrical shutter 23 having an imperforate bottom 24, said shutter having a portion of its side wall removed leaving an opening 25, which may be caused to register with the opening 22 by manipulating a knob 26, the stem of which passes thru a slot 27 in the casing 20 and limits the movement that can be imparted to the shutter.

Casing plate 21 and shutter plate 24 are further connected by an axial pivot 28, the same being shouldered and its upper, smaller portions used as a rivet in connecting the flat foot 29 of a flat stem 30 bent to extend upward into the container and terminating in a spatula or agitator 31 adapted to loosen the coffee so that it will drop freely into the combined casing and shutter directly below the opening in the annulus 15.

In order to maintain the shutter in a normally closed position, a spring wire 32 is attached by a pin 33 below the bottom of the casing plate 21, coiled about the pivot 28, extended outward adjacent the plate and bent up, as at 34, to engage the knob 26, the spring being so arranged as to close the shutter immediately the knob be released from the fingers in operation.

As it becomes desirable to remove the container for cleansing, it is supported principally by a bent strip of resilient material formed to present opposed embracing arms 35 extending from a base member 36 provided with holes for securing means by which the device is removably engaged with a wall.

A similar pair of resilient arms 37 extend from stems 38 riveted or otherwise secured together and formed with flat extensions 39 secured by screws or like fastenings 40 passing thru holes suited to receive them.

Thus the device can be entirely removed when desired, but for the purpose of filling, the cap 12 is only removed.

In operation, the knob 26 is merely pressed back, the cup 14 or its equivalent held to receive the coffee flowing thru the openings then brought into register and when a sufficient quantity has been received, the knob is released, permitting the spring to close the shutter.

Although the foregoing is descriptive of the preferred form of the embodiment of the invention, it is not intended to regard the same as limitative of the invention, it being obvious that changes in its form, proportions, sizes and details may be made, without departing from the scope of the invention as defined in the claim hereto appended.

Having thus described my invention, what I claim as new and desire to secure by Letters Patent, is:—

A container comprising a hollow transparent cylindrical body, having reduced upper and lower open ends, a cap removably engaged with the upper end, a cylindrical casing screwed on the lower end of said body, said casing having an opening in its side wall and a slot opposite the opening, a cylindrical shutter operable in said casing adapted to control the opening therethrough, a knob engaged with said shutter passing thru the mentioned slot, a resilient agitator carried by said shutter operable in said body and resilient means on the exterior of said casing for normally closing said shutter.

In witness whereof I affix my signature.

ERNEST W. WILLS.